United States Patent [19]

Humblot

[11] Patent Number: 4,517,435
[45] Date of Patent: May 14, 1985

[54] ELECTRIC RESISTANCE WELDING APPARATUS

[76] Inventor: Bernard Humblot, 22, Chemin du Parc, 78580 Bazemont, France

[21] Appl. No.: 547,224

[22] Filed: Oct. 31, 1983

[30] Foreign Application Priority Data

Jul. 11, 1983 [FR] France ............... 83 11510

[51] Int. Cl.³ ............................................. B23K 11/10
[52] U.S. Cl. .................................... 219/89; 219/86.25
[58] Field of Search ............... 219/89, 90, 86.25, 86.1; 901/42

[56] References Cited

U.S. PATENT DOCUMENTS 1,645,705 10/1927 Lewinka ................................ 219/89
2,341,459 2/1944 Martin ................................... 219/89
3,320,400 5/1967 Leathers ............................... 219/90
4,410,782 10/1983 Konno et al. ......................... 219/89

FOREIGN PATENT DOCUMENTS 484468 10/1929 Fed. Rep. of Germany .
2044476 2/1971 France .
2505697 11/1982 France .

Primary Examiner—Roy N. Envall, Jr.
Assistant Examiner—Catherine M. Sigda
Attorney, Agent, or Firm—Sandler & Greenblum

[57] ABSTRACT

A scissors-type electric welding apparatus is provided which has a transformer, a pair of electrodes, a pair of first arms movably mounted on the transformer, an electrically insulated articulation shaft, and a pneumatic jack. A pair of second arms are pivotably connected to the articulation shaft. The second arms support the electrodes on one end and are connected to the jack on the other end in order to move the electrodes apart to position the electrodes for welding workpieces. The electrodes are electrically connected to the first arms through the second arms. Each second arm includes a contact member mounted on the articulation shaft. Each first arm includes a free end which carries a contact shoe for interacting with a contact member. A biasing member is provided for urging the contact shoes against the contact members.

8 Claims, 5 Drawing Figures

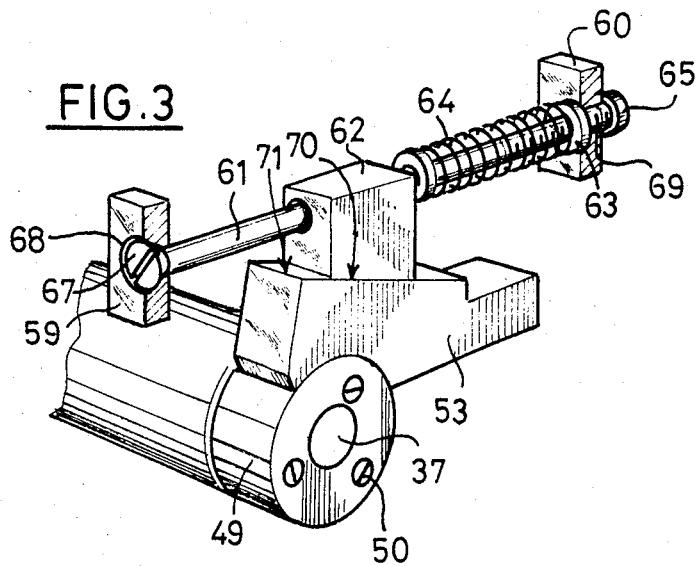
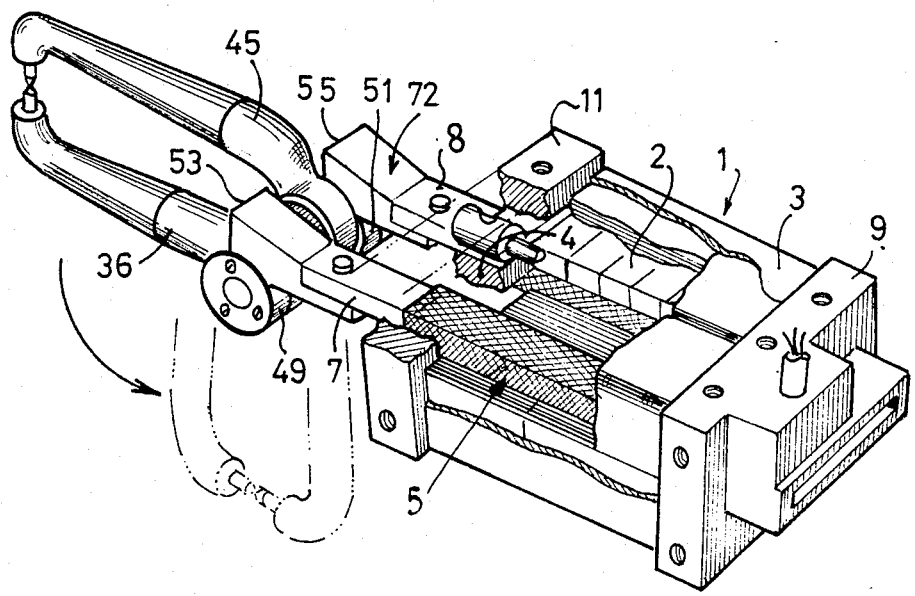

ELECTRIC RESISTANCE WELDING APPARATUS

FIELD OF THE INVENTION

The present invention relates to electric resistance welding devices, and particularly to scissors-type electric welding apparatus.

BACKGROUND OF THE INVENTION

Resistance welding units are known which include a frame for supporting the laminated magnetic circuit of a transformer which has two primary coils and a secondary circuit which is connected to the electrodes of the welding unit. Generally, in such units, each electrode is connected to the secondary circuit by flexible braids. These braids have the disadvantage of wearing out rapidly as a result of the intensive electrodynamic reactions which they are required to undergo.

In French Pat. No. 2,044,476 issued May 22, 1969, the present inventor discloses a resistance welding unit in which the welding electrodes are electrically connected to a secondary winding of a transformer which has a primary winding for connection to a source of alternating electric current. In this unit, the secondary winding is formed by two parallel bars which are electrically interconnected to one another on one end. The other ends of the bars are connected to the welding electrodes so that in conjunction with the work pieces to be welded, the bars form the secondary of the transformer. The parallel bars are moveable with respect to the primary winding.

The device disclosed in French Pat. No. 2,044,476 provides a welding unit with numerous advantages. First, the secondary circuit makes direct contact with the part to be welded. Also, the secondary circuit is simplified in that it includes only those parts of the two parallel bars which are located outside the magnetic circuit of the transformer, and, in addition, the corresponding portion of the workpiece to be welded. Further, the external secondary circuit has an impedance which remains constant. This device provides a transformer which is of reduced size and requires less operating power. Hence, a saving in electrical energy consumption is enabled, and the cost of each welding operation is reduced.

In present welding techniques and apparatus, the general objective is to provide an apparatus which is as automatic as possible, and to provide weight and size reductions. However, the underlying principle of the welding unit disclosed in French Pat. No. 69 16 670, described above, renders further reductions in size or weight difficult. Furthermore, the secondary circuit of the device disclosed in this patent is formed of two parallel bars which are guided separately and are interconnected in the transformer by a flexible shant. As a result, maintenance operations require the dismantling of the transformer and the provision of two guiding devices for each bar.

In French Pat. No. 2,505,697 filed May 12, 1981, the present inventor provides a resistance welding unit similar to French Pat. No. 2,044,476, but which is more compact, light-weight and requires a minimum of maintenance. This system is directed to a welding unit for direct welding spots. In this system, the transformer consists of a primary winding for connection to an alternating current source and a secondary winding which includes a single turn and which is movable in the transformer. The secondary winding includes a bar having a rectangular U-shaped cross section. One limb of the U-shaped bar is connected by a braid to one electrode and the other limb is rigidly connected to the other electrode. Such device offers significant advantages in that it eliminates the need for a guiding system for the secondary circuit because the secondary circuit is rigidly connected to an electrode which in turn is supported by the jack.

The invention disclosed in French Patent Application No. 2,505,697 relates to a novel welding unit of the "scissors" type, in which the electrodes are pivotally mounted on or articulated to a single common shaft and are connected to a jack, such that the electrodes can be opened and closed with respect to each other. The electrodes are connected to the secondary of the transformer. It can be readily understood that the electrode movements require the provision of flexible braidings. The attendant inconveniences associated with flexible braidings are well known.

U.S. Pat. No. 1,645,705 discloses a welding device which includes a high-power transformer which has secondary outputs which are connected by bars to a shaft for supporting the welding pincers. In this device, one bar is electrically connected via the shaft to one of the electrodes and is insulated from the other electrode, while the second bar is electrically connected via the shaft to the other electrode and is also insulated from the other electrode. Upon initial consideration, this device might appear to offer advantages, but in actuality it is less advantageous than the above-described welding devices for the following reasons. First, the bars result in a substantial lengthening of the secondary circuit, thus increasing electrical impedance. Furthermore, because the bars are in contact with the shaft about which the welding pincers rotate, substantial friction must result; without this substantial friction, the required contact between the bars and the pincers is not provided and the numerous adjustments of the angular position of the pincers are difficult to implement. Finally, in this device, the bars tend to move apart, due to electrodynamic reactions, in the opposite direction to the movement required for satisfactory contact between the parts.

It is, therefore, an object of the present invention to provide an improved electric resistance welding apparatus which substantially overcomes the above-described deficiencies in the prior art devices.

SUMMARY OF THE INVENTION

According to the present invention, a scissors-type electric welding apparatus is provided which includes a transformer, a pair of electrodes, a pair of first arms movably mounted on the transformer, an articulation shaft, a jack, and a pair of second arms each pivotably connected to the articulation shaft. The second arms have ends for supporting the electrodes and opposing ends for connection to the jack for moving the electrodes apart in position for welding workpieces. The electrodes are electrically connected to the first arms through the second arms. Each second arm includes a contact member mounted on the shaft, and each first arm includes a free end including a contact shoe for interacting with a contact member.

The apparatus can include biasing means for urging the contact shoes against the contact members. The contact shoes can include a portion having a shape which corresponds to a segment of a contact member.

Each contact member can be integral with a second arm. The contact members can include substantially circular contact members and each contact shoe can include a concave portion having a shape corresponding to a segment of a substantially circular contact member.

The contact members can include a substantially circular contact member and an electrically conductive circular element having a substantially central aperture through which the circular contact member is mounted on the shaft.

The transformer can include a primary winding for connection to an alternating current source and a single-turn secondary circuit. The pair of first arms can be associated with a substantially U-shaped bar. The jack can be a pneumatic jack.

Each contact shoe can include an inclined portion disposed on a side of the contact shoe which is opposite to the portion of the contact shoe which has a shape corresponding to a segment of the contact member. The apparatus can also include a pair of inclined members, and the biasing means can be elastic means for biasing the inclined members against the inclined portions of the contact shoes to urge the contact shoes against the contact members. The inclined portion of each contact shoe can include a ramp. The inclined members can include sloping wedges. The elastic means can include tension adjustment means.

The apparatus can also include a pair of rods each disposed in a common plane with a respective contact shoe and each having a nut on one end. An inclined member can be mounted on a rod and the elastic means can include a pair of elastic members each disposed between an inclined member and a nut. The rods can include screw-threaded rods, and the elastic members can comprise a compression spring.

The apparatus can also include a frame on which the transformer is mounted. Such frame includes a pair of guide elements. The jack can include a jack body which is movable in the pair of guide elements; the jack body is connected to an end of one of the second arms. The jack can further include a piston rod connected to an end of the other of the second arms. Each guide element can include a cheek having a first slot substantially parallel to a longitudinal axis of the transformer, with the jack body being slidably connected with each of the slots. The jack body can have a strap on one end in which the piston rod is slidably mounted. Such strap includes a pair of flanges each having a second slot extending substantially perpendicularly with respect to the first slots. An end of each second arm is slidably mounted within a first slot. The first and second slots can comprise elongated slots.

The device can also include stop means for limiting the angle to which the second arms supporting the electrodes can open.

The frame on which the transformer is mounted can include a guide sleeve. The jack body can include a cylinder with an aperture on one end. A fastening member can be disposed in the aperture, one end of the fastening member including first stop means disposed in the cylinder for limiting movement of the pisting rods, another end of the fastening member including second stop means for cooperating with the guide sleeve for limiting movement of the jack body. The aperture can include a tapped hole, and the fastening member can include a screw.

From the above, it is seen that an object of the electric resistance welding apparatus according to the present invention is to provide a scissors-type welding apparatus which employs a transformer of the type disclosed in French Patent Application No. 2,505,697, the disclosure of which is hereby incorporated by reference thereto, but which eliminates the need for flexible braidings while retaining all the other above-mentioned advantages associated with such device. The welding apparatus according to the present invention enables a transformer of reduced size and weight to be used. Good electrical connection between the contact shoes and the contact members is provided, even after the welding apparatus has been in use for long time periods. The welding unit according to the present invention constitutes a highly compact unit. Due to the operation of the above-described second stop means which cooperates with the guide sleeve for limiting movement of the jack body, whatever the position of the welding apparatus in space, when the electrodes are apart, neither of the second arms will be able to tilt; this is a particular advantage in robotic applications.

BRIEF DESCRIPTION OF THE DRAWINGS

Embodiments of the present invention are shown in the accompanying drawings, wherein:

FIG. 3 is a detailed perspective view on a larger scale of the electric resistance welding apparatus illustrated in FIGS. 1 and 2;

FIG. 5 is a perspective view of the transformer of the electric resistance welding apparatus according to the present invention:

DETAILED DESCRIPTION OF THE INVENTION

Figure 1:
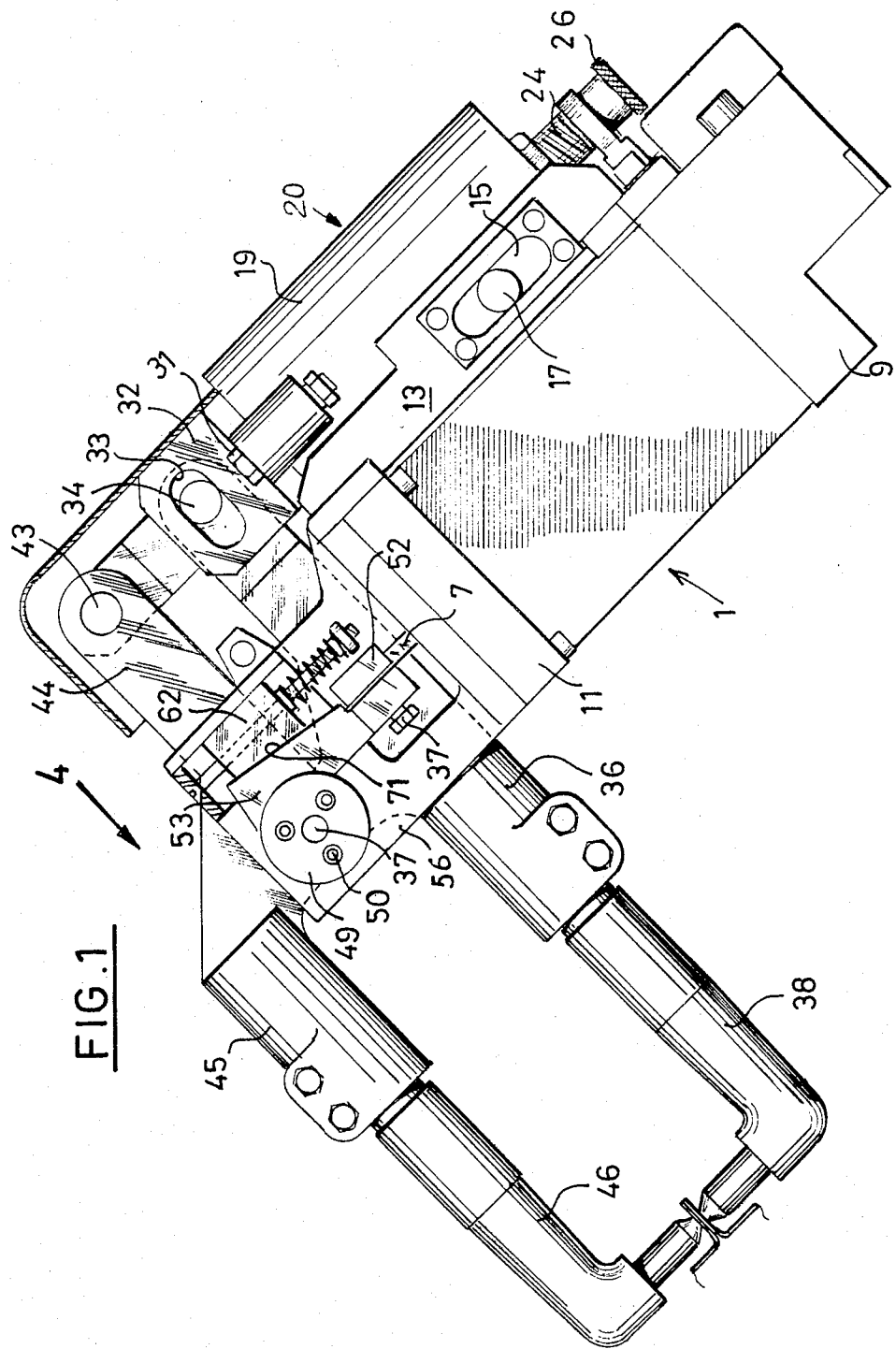
FIG. 1 is a side elevation view of a scissors-type electric resistance welding apparatus in accordance with the present invention.
Figure 2:
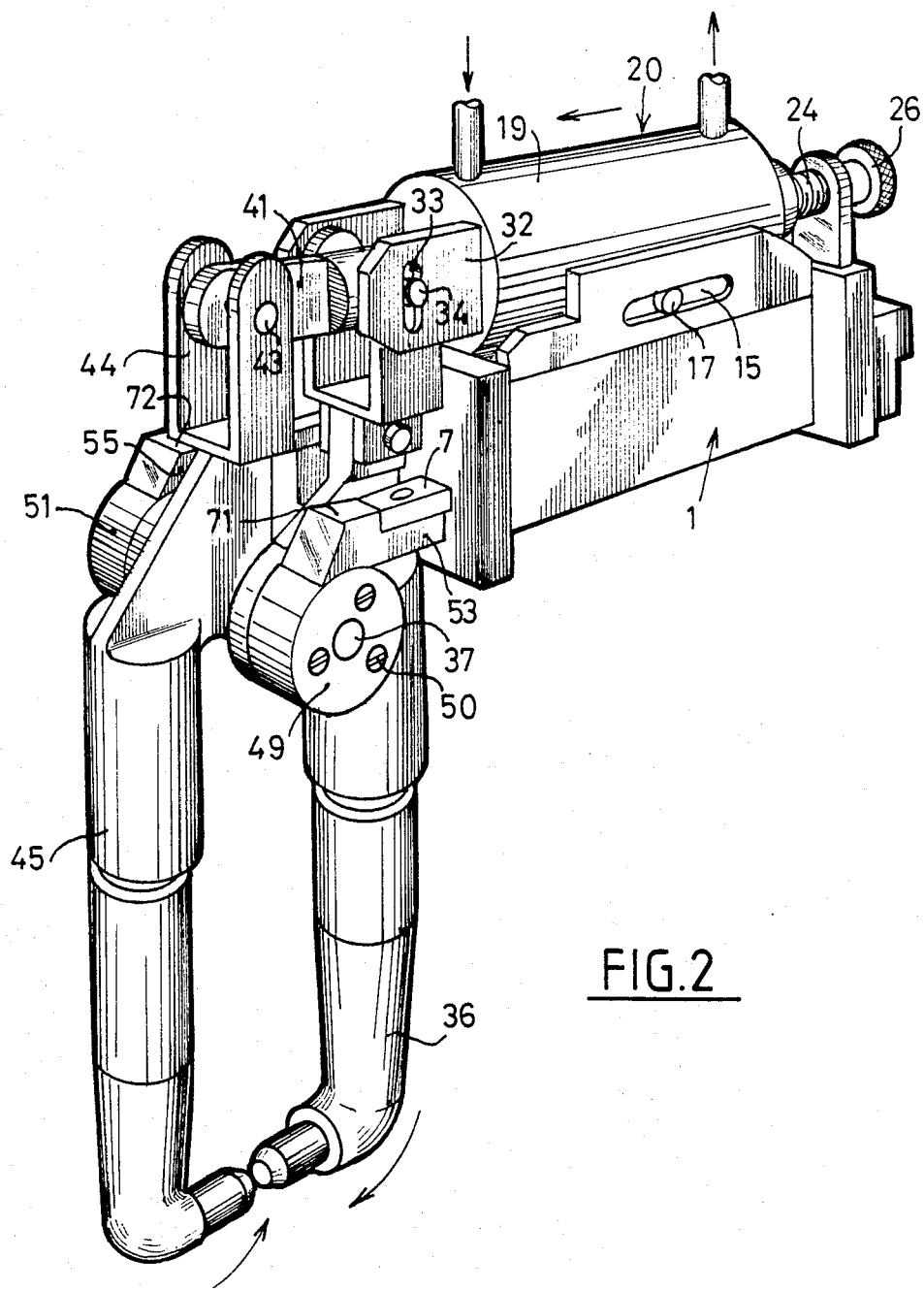
FIG. 2 is a perspective view of the welding apparatus illustrated in FIG. 1.
Figure 4:
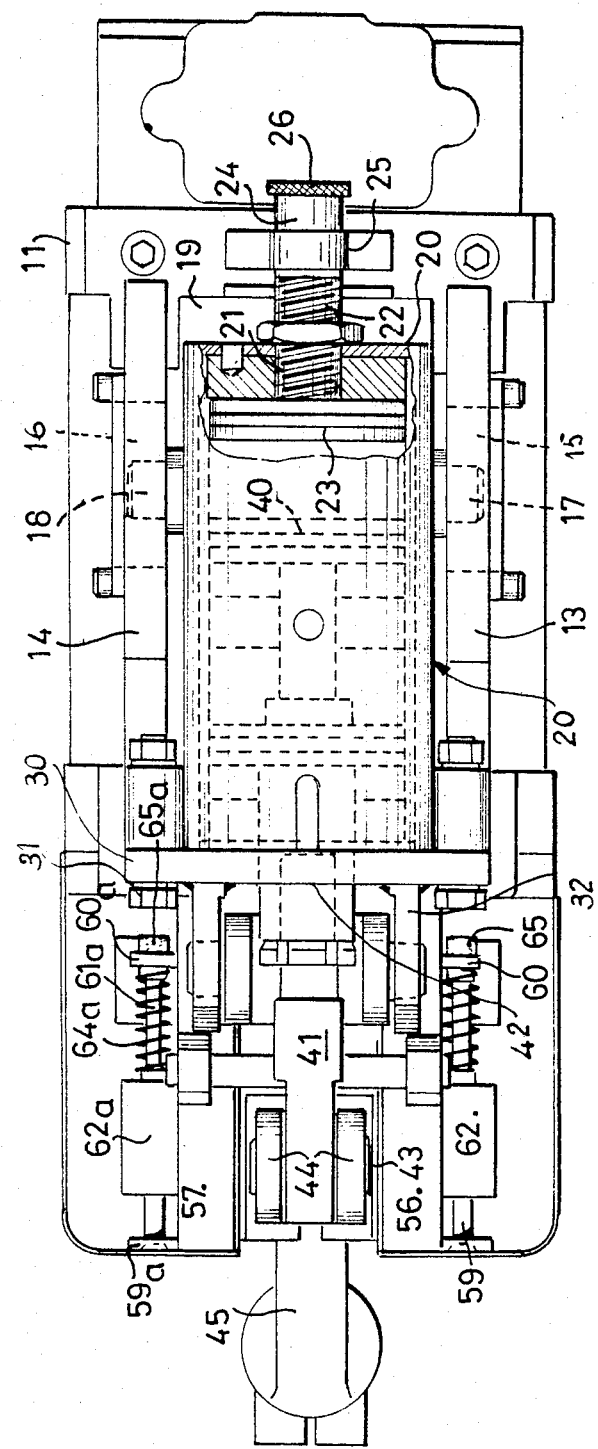
FIG. 4 is a partial plan view of the electric resistance welding apparatus according to the present invention.

The figures illustrate an electric resistance welding unit which includes a transformer, designated by reference numeral 1. Transformer 1 includes laminated magnetic circuit 2 which is supported in tubular casing 3 by two primary winding coils powered by an alternating current source (not shown) and by secondary circuit 5 which is formed by a copper bar of flat U-shaped cross section, the bar having two arms or limbs 7 and 8. Secondary circuit 5 is mounted such it is moveable with respect to the primary circuit of the transformer. The various elements are properly electrically insulated. A cooling system (not shown) is provided, as is conventional and well known in the art.

Tubular casing 3 is supported between two clamps 9 and 11. Clamps 9 and 11 support two plates, 13 and 14, which include slots or apertures 15 and 16 respectively. Slots 15 and 16 may be oblong-shaped. Apertures 15 and 16 are respectively engaged by studs 17 and 18 which are preferably formed integrally with body 19 of pneumatic jack 20. Body 19 of jack 20 is provided at one end with aperture or tapped hole 21 for receiving fastening means or screw 22. The portion of screw 22 which is located in the cylinder of jack 20 is integral with first stop means or circular stop 23. The other end of screw 22 includes an extended smooth cylindrical part 24 adapted to slide in sleeve 25 which is affixed to clamp 11. Screw 22 terminates in second stop means or operating button 26 which forms a stop. Nut 27, which may be a lock nut, fits onto smooth cylindrical part 24.

Body 19 of jack 20 includes, at its end opposite to that having stop 26, clamp 30 which is secured to body 19 by screws 31. Clamp 30 includes a plate having two spaced, integral flanges 32, each flange having a slot 33, which may be oblong-shaped. Slots 33 extend in directions substantially perpendicular to the directions in which slots 15 and 16 extend.

Two studs 34 are integral with stirrup 35 which is extended by arm 36. Studs 34 interact with slots 33. Arm 36 supports electrode 38 and is pivotally mounted on shaft 37.

Jack 20 includes piston 40 which has a piston rod 41 which passes through aperture 42 in the base of the plate of clamp 30. At its free end, piston rod 41 supports shaft 43. Flanges 44 are connected to a plate which is integral with arm 45. Flanges 44 are pivotally connected to or articulated to shaft 43. Arm 45 is pivotably connected to or articulated to shaft 37 and supports electrode 46. Shaft 37 serves as an insulator, and arm 36 carries substantially circular contact member 49. Contact member 49 is secured to arm 36 by screws 50 and is mounted on and pivotably engages shaft 37.

Circular contact 51 is affixed in the same manner as circular contact 49 to arm 45 and similarly is mounted on and pivotably engages shaft 37. Shoe 53 is secured to limb, arm or branch 7 of secondary circuit 5 via clamp 52. Shoe 53 includes a contact surface which engages with or interacts with contact 49. This contact surface of shoe 53 is preferably concave to correspond to the shape of substantially circular contact member 51. Second limb, arm or branch 8 of secondary circuit 5 includes shoe 55 which is affixed to arm 8 by plate 56 and which has a contact surface, preferably concave, for engaging with or bearing against contact member 51 which is preferably substantially circular in shape. The concave contact surfaces of shoes 53 and 55 have a shape which corresponds to a segment of the circumference of substantially circular contact surfaces 49 and 51. It should be noted that the contact shoes includes a portion which has a shape which corresponds to a segment of the contact members, and the scope of the present invention is not limited to a particular shape thereof.

Shaft 37 is supported by two plates 56 and 57. Plates 56 has two holders 59 and 60 with holes 68 and 69 respectively. Holes 68 and 69 are traversed by screw 61, one end of which includes head 67 while the other end terminates in stop 65. Inclined member or sloping wedge 62 can slide freely on screw 61 and includes inclined ramp 70 for engaging with or interacting with a corresponding inclined portion or ramp 71 of shoe 53. Compression spring 64 is disposed between nut 63, which is mounted on screw 61 in the region of stop 65, and the corresponding end of inclined member or sloping wedge member 62. By turning screw 61 with, e.g., a screwdriver, it is possible to move nut 63 and thus adjust or regulate the tension of elastic means or spring 64.

Inclined member or sloping wedge 62a is preferably substantially identical with inclined member or sloping wedge 62, and is provided to engage or interact with inclined portion or ramp 72 of shoe 55. Inclined member or sloping wedge 62a can, of course, be mounted in the same manner as described above in connection with inclined member or sloping wedge 62. Further, similar components to those described above with respect to inclined member or sloping wedge 62 and its associated structure have been given the same reference numbers in the figures but with the addition of the letter "a" for inclined member or sloping wedge 62a and its associated structure.

It should be noted that the electric resistance welding unit according to the present invention can be used with particular advantage for industrial robots used for spot welding by the resistance method. This particular advantage accrues because the weight of the welding apparatus according to the present invention can be limited to a weight compatible with the needs of robotic devices. In the operating state, the welding unit of the present invention weighs approximate 38 Kg.

A further important advantage of the welding apparatus of the present invention is that regardless of the position of the apparatus in space, the distance between the electrodes in the open position remains the same, whereas this distance was variable in prior art welding units. Also, second arms 36 and 45 can form varying angles relative to one another according to whether the desired welding spots to be produced are located to the side of the transformer or in front of it.

To move the electrodes apart, compressed air is conveyed into jack body 19 from the side of piston rod 41 of piston 40, i.e., into the region of the jack body or cylinder below tube 81. Piston 40 is thereby caused to move such that it abuts against first stop means 23. This movement of piston 40 corresponds to or limits the maximum opening angle of arm 45. When piston 40 is blocked by first stop means 23, body 19 of jack 20, which is guided by studs 17 and 18 in slots 15 and 16, moves in the direction shown by arrow F. Flanges 32 of the plate of clamp 30 interact via slots 33 with studs 34 to cause arm 36 to tilt in the direction required for opening thereof, until second stop means 26 comes to rest against the corresponding edge of sleeve 25. It is easily understood that in this opened position, regardless of the position of the welding apparatus in space, neither arm 36 or 45 can pivot with respect to shaft 37, because jack body 19 and piston 40 are resting against respective first and second stop means 23 and 26.

The extent to which arms 36 and 45 may be opened can be adjusted by tightening or releasing screw 22.

In order to carry out a welding operation, with the transformer under tension, compressed air is conveyed from the free side of piston 40 into jack body 19, i.e., through tube 83 between piston 40 and first stop means 23, in order to cause arm 35 to tilt in the direction of arrow G, while arm 36 tilts in the direction of arrow H. This movement of arm 36 is caused by the displacement of jack body 19 of jack 20 in the direction opposite to that of arrow F.

The electric resistance welding unit according to the present invention inherently provides a great number of advantages in addition to those already enumerated. One advantage is that because the terminals of secondary circuit 5 are almost directly connected to arms 36 and 45 of the electrodes, the volume of the welding apparatus can be reduced. Moreover, by eliminating flexible braidings, a highly significant advantage is achieved because the secondary impedance of the transformer is reduced thereby. Because the secondary circuit of the transformer is movable with respect to the primary circuit, contact shoes 53 and 55 can be automatically centered, the wear incurred by them can be compensated and narrow tolerances for machining and mounting of the pincers with respect to the secondary circuit terminals of transformer 1 can be more readily satisfied.

From the foregoing description, one skilled in the art can easily ascertain the essential characteristics of the present invention, and without departing from the spirit and scope thereof, can make various changes and modifications of the invention to adapt it to various usages and conditions. Accordingly, the invention is not confined to the embodiment which is described above and which is illustrated in the drawings; numerous modifications can be made thereto with respect to details without departing from the principle of the invention.

What is claimed is:

1. Electrical resistance welding apparatus comprising;
   (a) a frame on which is mounted a transformer having a primary winding adapted to be connected to a source of alternating current;
   (b) a U-shaped, single turn secondary magnetically coupled to the primary winding and having a pair of spaced arms;
   (c) a pair of electrodes pivotally mounted on a common shaft carried by said frame, each electrode having a contact with a circular surface that is concentric with the axis of the shaft;
   (d) a fluid operated jack;
   (e) coupling means interconnecting said jack to said pair of electrodes for causing said electrodes to pivot like scissors about said shaft in response to the application of fluid to said jack; and
   (f) contact shoes electrically connected to the respective arms of said secondary and in electrical engagement with the circular surfaces of the contacts on said electrodes during their pivotal movement on said shaft.

2. Electrical resistance welding apparatus according to claim 1 including bias means for resiliently urging the contact shoes into engagement with the respective circular surfaces of the contacts on said electrodes.

3. Electrical resistance welding apparatus according to claim 1 wherein the bias means includes a wedge having a sloping face engaged with an inclined ramp on said shoe, and means for resiliently urging said wedge into engagement with the shoe.

4. Electrical resistance welding apparatus according to claim 3 wherein the bias means includes a rotatable screw that passes through said wedge, a nut threaded on said screw, and a compression spring coiled around said screw and interposed between said nut and said wedge, rotation of said screw in one direction causing said nut to compress said spring and increase the normal force between the contact shoe and the circular surface of the contact.

5. Electrical resistance welding apparatus according to claim 1 wherein said jack includes a body slideably mounted in said frame, and a piston rod slideably mounted on said body for movement relative thereto in response of the application of fluid to the jack, first means coupling said body to one of said electrodes, and second means coupling said rod to the other of said electrodes.

6. Electrical resistance welding apparatus according to claim 5 wherein said frame includes a pair of slotted plates between which the body of the jack is located, said body having studs slideably received within the slots in the last mentioned plates, a clamp mounted on an end of the body and carrying a pair of spaced, slotted plates between which a free end of one of the electrode coupling means is mounted, said last mentioned free end having studs slideably received within the slots in the plates on said clamp, and a free end of said piston rod being pivotally connected to a free end of the other of the electrode coupling means.

7. Electrical resistance welding apparatus according to claim 6 including stops for limiting the aperture angle of the electrodes.

8. Electrical resistance welding apparatus according to claim 7 including a rod threaded into the end of the body of the jack opposite to the end on which the clamp is located, and one of said stops being constituted by an abutment on the rod located inside the body and cooperable with the piston, and the other of said stops being constituted by an abutment on the rod outside the body cooperable with a sleeve mounted on said frame.

* * * * *